Aug. 23, 1960                    R. ORSINI                    2,950,037
            PACKAGES FOR LIQUID, PASTY AND PULVERULENT MATERIALS
Filed Aug. 9, 1957                                    5 Sheets-Sheet 1
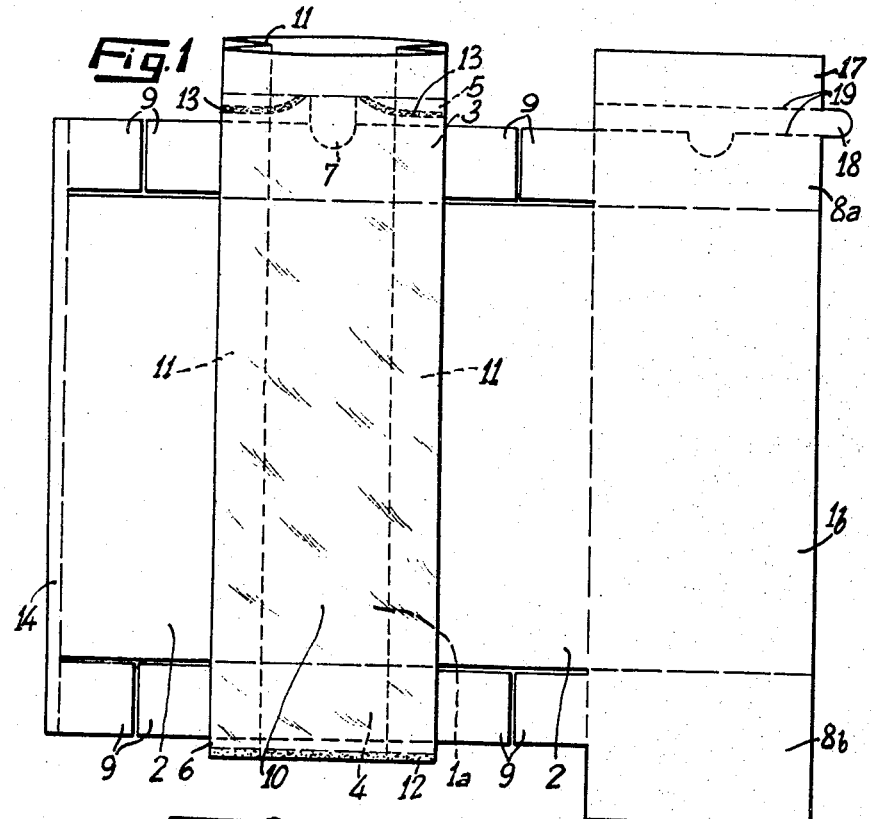
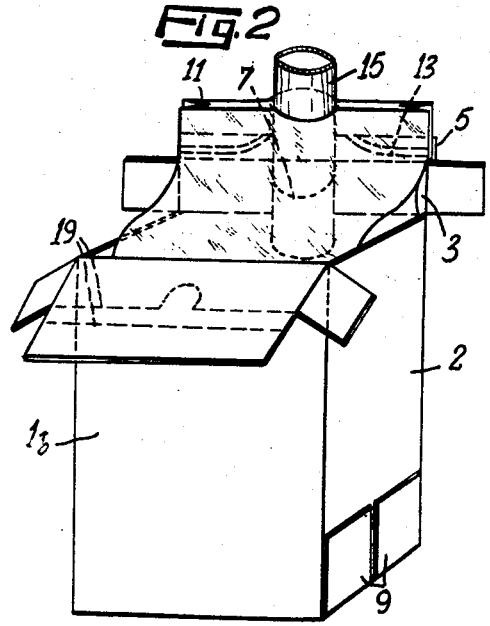

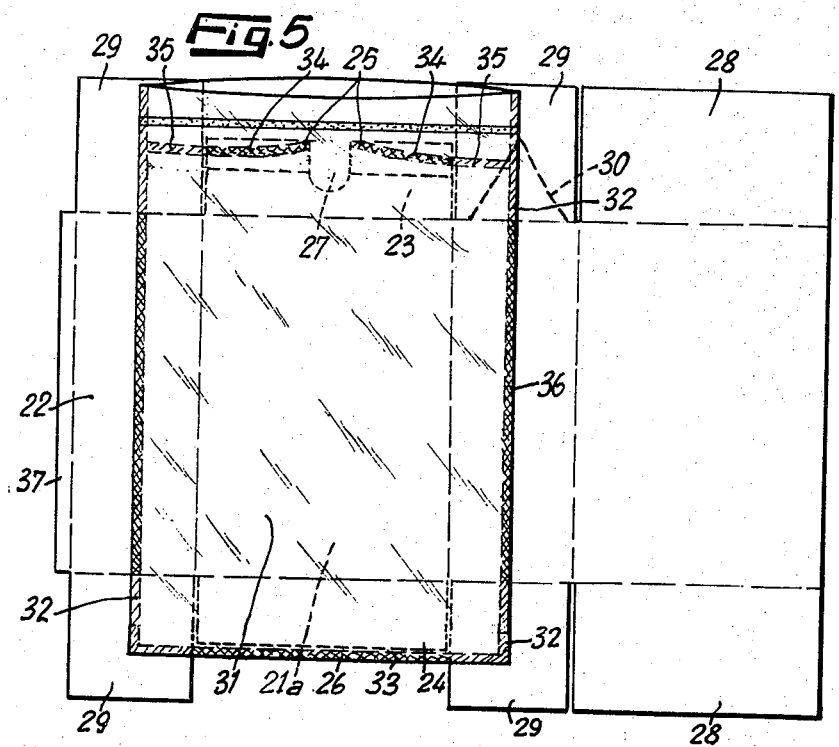
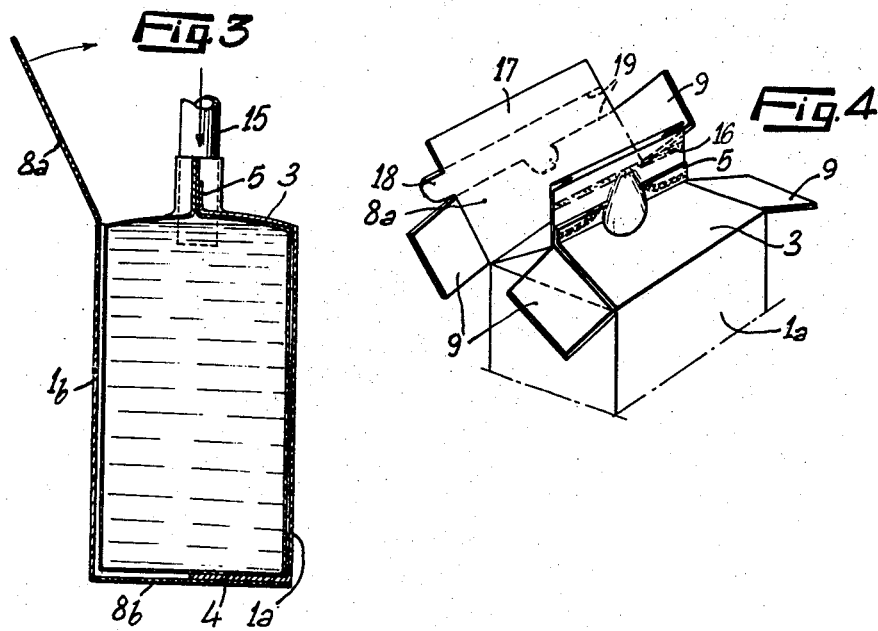

Aug. 23, 1960 R. ORSINI 2,950,037
PACKAGES FOR LIQUID, PASTY AND PULVERULENT MATERIALS
Filed Aug. 9, 1957 5 Sheets-Sheet 3
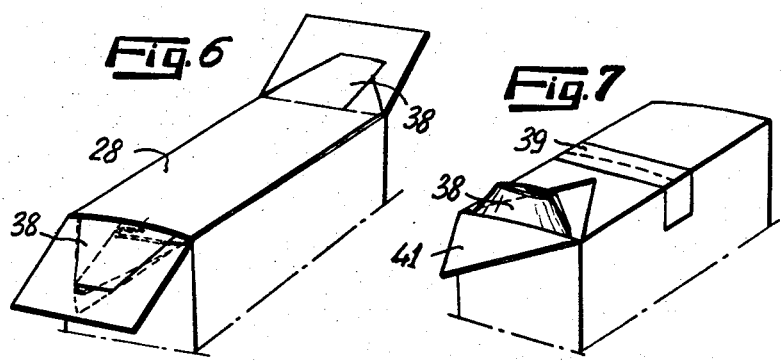
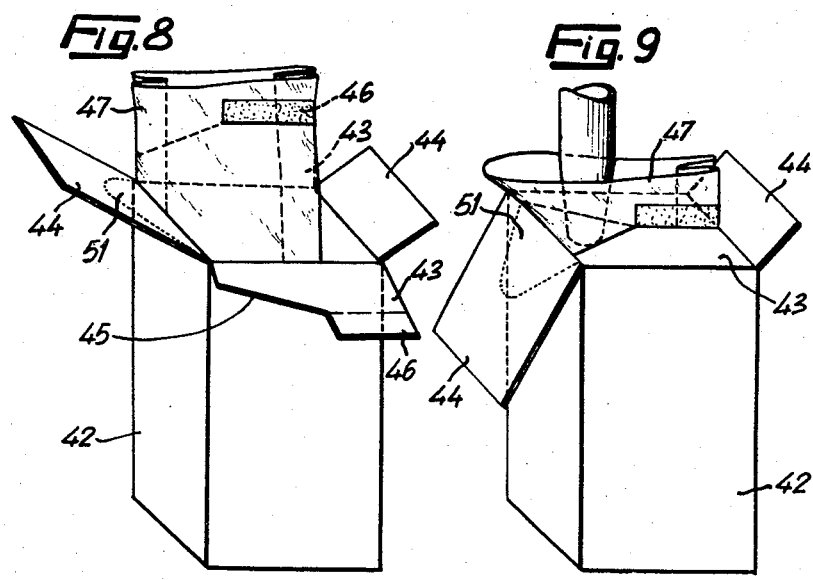

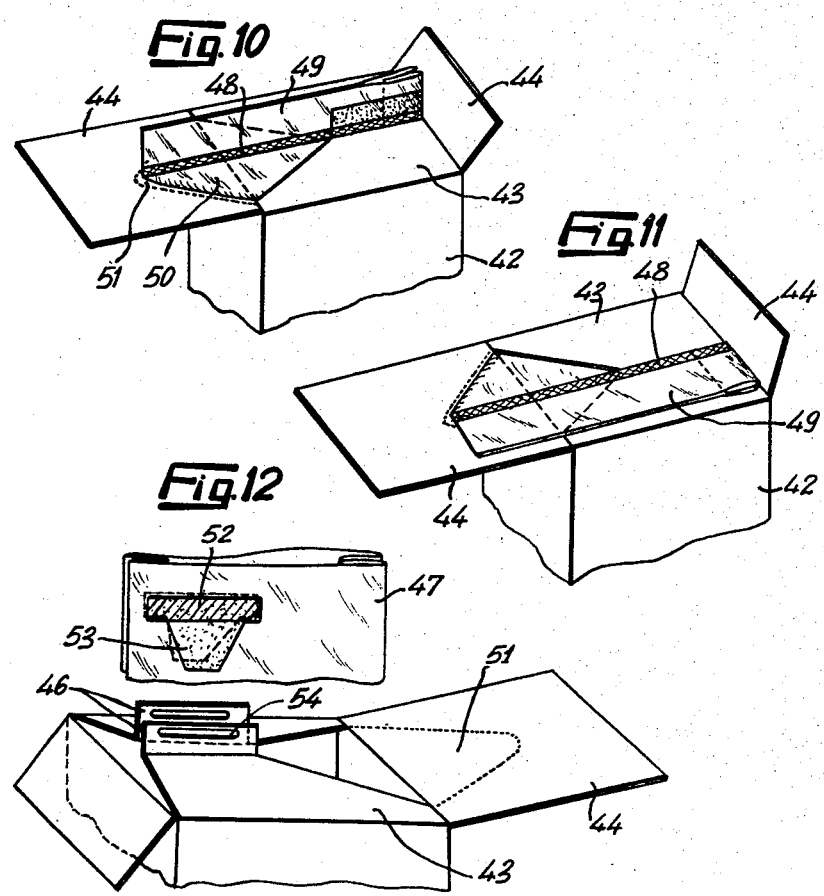

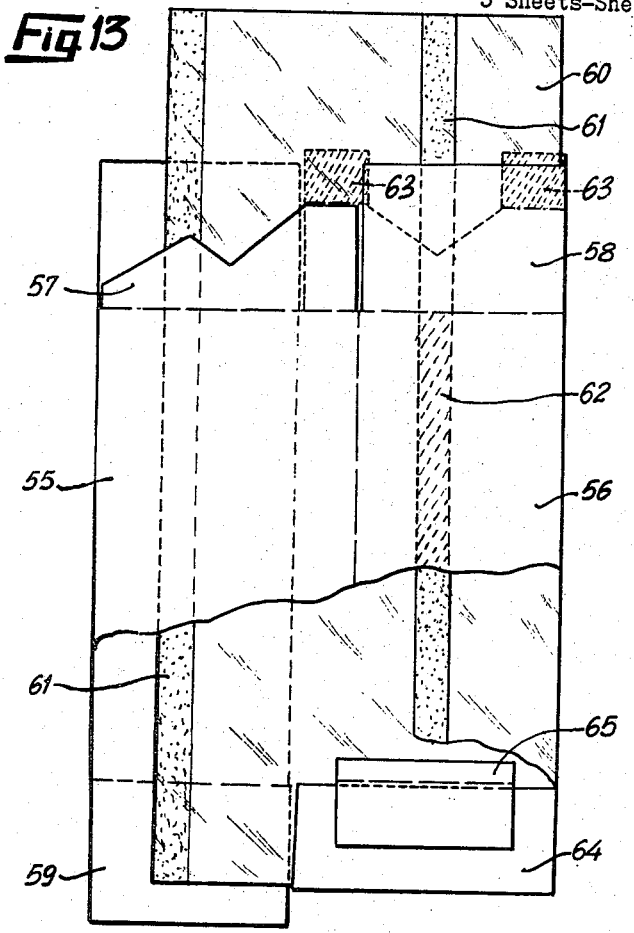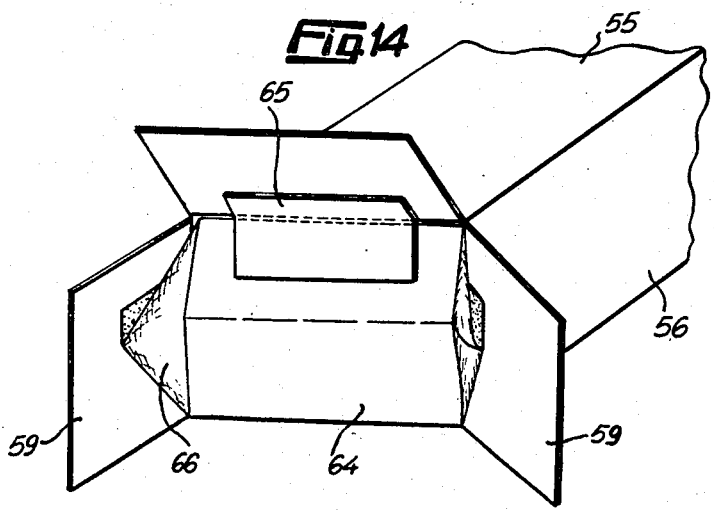

United States Patent Office 2,950,037
Patented Aug. 23, 1960

2,950,037

PACKAGES FOR LIQUID, PASTY AND PULVERULENT MATERIALS

René Orsini, Casablanca, Morocco, assignor to S.A. Plastus, a corporation of Switzerland Filed Aug. 9, 1957, Ser. No. 677,260

Claims priority, application France Aug. 11, 1956

5 Claims. (Cl. 229—14)

The present technique for the packaging of liquid, pasty and pulverulent products leads to the substitution for the old fashioned brittle and heavy glass bottles and for the iron cans of packages of plastic material of various types. Bottles of molded plastic material are expensive and bags of plastic material which are cheaper show also numerous drawbacks and in particular they cannot be used rationally on the extant bottling machines; they have an irregular shape and do not allow an easy storing and packaging for shipping purposes; they have no sufficient rigidity, unless they are given a substantial thickness which increases the cost price, otherwise than through the presence of the liquid mass filling the inside of the bag and as soon as the bag has been opened, it is necessary to make use of its contents.

It has been proposed already to remove some of said drawbacks by producing bags which, when filled, are deformed after the manner of the well known bellow-shaped bags so as to assume a substantially parallelopipedic shape and it has also been proposed to insert such bags when filled inside packages such as cardboard boxes matching substantially said shape.

However, the plastic bags being entirely independent of the rigid packages, it is not possible to fill them otherwise than on specially designed machines and they retain their shape only through the internal liquid pressure exerted inside them. They cannot replace practically the conventional bottles or the like rigid packages.

The execution of a compound package including a bag of yielding plastic material and of an outer semi-rigid casing such as a cardboard box in which the two elements, the bag and the box, are rigidly secured to each other shows considerable difficulties since the connection between said elements should be such that the bag may deform freely inside the outer casing. All prior propositions for solving this problem resort to compound shapes for the bags and for the outer casings which shapes it is difficult to execute in practice.

The package according to my invention is of the type constituted by an outer semi-rigid box including closing flaps and associated with a yielding bag, at least the upper section of which is rigidly secured to the semi-rigid outer casing.

According to a main object of my invention, the flap of the casing carrying the bag includes an extension beyond the axis of the casing, which extension is separated from the actual flap by a fold forming a hinge allowing this extension to occupy at least one position perpendicular to the flap, the bag being secured to said extension.

The yielding bag is preferably associated also through its bottom with the bottom of the rigid casing; the plastic bag is, according to a preferred embodiment, secured in its flat condition over a side and the corresponding flap of the box also in its flat condition, the lower edge of the bag being welded to the flap at the bottom of the casing while the upper section of the bag is similarly welded over at least a fraction of its breadth and at a short distance from the open end of the bag to the foldable extension formed on the flap adapted to form a portion of the top of the casing. The lower flap is also and preferably provided with a foldable extension to which is welded the lower edge of the bag.

The plastic bag may be of the bellow-shaped type and its breadth is then equal to the breadth of the side wall against which it is to bear, the expansion of the bellows corresponding to the depth of the casing. The bag may also form a flat bag with or without lateral lines of weld and in this case its lateral edges are preferably secured along the medial lines of the adjacent side walls of the casing.

When a bellow-shaped bag is used, said bag may be rigidly secured to the extension of the cooperating flap through two lateral lines of weld extending in registry with the bellows so as to leave between them an open central filling neck; however it is preferable to secure rigidly such a yielding bellow-shaped bag with the flap of the casing only over a fraction of its breadth so as to leave the second section of the bellows in a free condition. This latter embodiment shows advantages chiefly as concerns the easy securing of the bag to the flap of the casing and furthermore it allows providing a large cross-sectional filling area. On the other hand, during the filling, the free bellows are deformed after the manner of a flat bag and produce a triangular fold engaging the lateral flap on the casing, which allows forming a spout for pouring out the contents of the bag.

According to a modification, the connection between the upper section of the yielding bag and the flap of the casing is executed in a removable manner for instance by engaging lugs provided on a reinforcement fitted in registry with the weld of the bag inside cuts provided in the flaps.

According to an improvement brought to the package incorporating a flat bag, I secure preferably through gluing the surfaces of said bag adapted to form the bottom thereof onto a flap matching the surface of said bottom and folded in V-formation over the lower edge of the bag and provided with a tongue-shaped extension.

I will now describe various embodiments of the packages according to my invention, reference being made to the accompanying drawings, wherein:

Fig. 1 is a developed view of a package with a cardboard casing and a bellow-shaped bag.

Fig. 2 is a perspective view of the package of Fig. 1 at the beginning of its filling.

Fig. 3 is a transverse sectional view of the package at the beginning of the filling procedure.

Fig. 4 is a perspective view of the upper section of the package at the moment of its closing.

Fig. 5 is a view corresponding to Fig. 1 of a package including a cardboard box and a flat bag.

Fig. 6 is a perspective view of the upper section of the casing or box of Fig. 5 during its closing.

Fig. 7 is a perspective view corresponding to Fig. 6 during the opening prior to the pouring out of the contents of the box.

Fig. 8 is a perspective view of a modification of the arrangement according to Fig. 1.

Fig. 9 is a perspective view of the upper section of the casing of Fig. 8 during the filling operation.

Fig. 10 is a view corresponding to Fig. 9 after the filling and closing of the bag.

Fig. 11 is a view corresponding to Fig. 10 after folding of the upper section of the bag over the closed flaps.

Fig. 12 is a view of the upper section of a casing in which the bellow shaped bag made of plastic film material is removably secured to the cooperating flap.

Fig. 13 is an elevational view partly torn off of the front section of a cardboard box enclosing a flat bag and provided with a bottom flap which allows opening the yielding bag in a preliminary manner.

Fig. 14 is a perspective view of the bottom of the box or casing of Fig. 13 in its developed shape.

Turning to the package illustrated in Figs. 1 to 4, 1a, 1b designate the larger front and rear walls of the cardboard box or casing and 2 designates the narrower lateral walls. The front wall 1a includes extensions forming an upper flap 3 and a lower flap 4 and the length of said flaps is equal to one half the breadth of the narrower lateral wall 2. Said flaps 3 and 4 terminate with folded flanges 5 and 6 respectively, the part played by which will be disclosed hereinafter.

In the folded flange 5 and in the corresponding flap 4 is provided a cut 7 the section of which extending inside the flap 3 is semi-circular. The rear wall 1b also includes terminal extensions forming the flap 8a at its upper end and the flap 8b at its lower end, the length of which flaps is also equal to one half the breadth of the lateral wall 2. The flap 8a carries lines 19 forming lines of initiating breaking which may be constituted for instance by lines of perforations. The lateral edges of the flaps 3—4, 8a—8b extend into further lateral projecting flaps 9.

The bag of plastic material 10 is of the type including lateral bellows 11 and the development of the bellows 11 is equal to the depth of the side wall 2 while the breadth of the front and rear walls of the bag is equal to the breadth of the corresponding walls of the box or casing. The bottom of the bag is welded at 12 to the folded flange 6 while its upper section is welded at 13 to the folded flange 5. Said weld 13 rigidly secures the bag to the folded flange and furthermore it welds the bellows 11 with the side walls of the bag in accordance with a well known technique so as to allow a parallelopipedic deformation of the filled bag while ensuring the presence in registry with the cut section 7 in the flap 3 of an opening for filling purposes.

The package thus constituted is shaped through folding, the lateral tongue 18 being glued or welded to the free edge of the rear wall 1b. The bottom is closed by folding first the flap 4 and folding outwardly the flange 6 which ensures a folding of the lower end of the bag of plastic material after which the flap 8b and the lateral flaps 9 are folded and glued.

The package is now ready for filling (Fig. 2). To this end I introduce a filling spout 15 into the upper section of the bag and through the opening left free between the partial welds 13. The bag is then filled and it deforms gradually so as to assume a parallelopipedic shape which has for its result a folding of the flap 3 while the folded flange 5 retains its vertical position as clearly apparent from inspection of Fig. 3. The spout 15 is then removed and the section of the bag lying above the folded flange 5 is welded along the line 16 and the package is finally closed by folding outwardly said flange 5 and then folding the flap 8a which may be glued or welded through its outer extreme section 17 over the flap 3 and lastly the small lateral flaps 9 are folded back and glued over the box.

To open the package, it is sufficient to tear off through the agency of the tongue 18 the section of the flap 8a extending between the dot and dash lines 19. The folded flange 5 rises then and sets the upper edge of the bag of plastic material in a vertical location. It is then an easy matter to cut the plastic bag underneath the line 16 and the package appears with a central substantially cylindrical opening through which its contents may be poured out after the manner of the contents of an ordinary bottle.

The second embodiment illustrated in Figs. 5 to 7 is constituted by a cardboard box, the arrangement of which is similar to that shown in Figs. 1 to 4. It includes two large front and rear walls 21a and 21b which are interconnected by the narrower lateral walls 22. The front wall 21a extends upwardly and downwardly so as to form the flaps 22 and 23 the length of which is equal to one half the breadth of the said lateral walls and which also include folded flanges as shown at 25 and 26. Across the middle of the folded flange 25 and of the cooperating flap 23 is provided a cut 27 similar to the cut 7 described with reference to the preceding embodiment.

The rear wall 21b also includes an upper and a lower extension at 28 the length of which is equal to the breadth of the walls 22. The walls 22 include also upper and lower flaps 29 the length of which is equal to one half the breadth of the walls 21. The upper flap 29a of one of the walls 22 carries a triangular outline constituted by lines of initiating breaking such as lines of perforations the purpose of which will be disclosed hereinafter.

The bag of plastic material 31 is a flat bag constituted by a length cut out of a sheet and closed at one end or again by two sheets connected along three of their cooperating edges by lines of weld 32. The bag is secured to the cardboard box on the one hand by a weld at 32 along the folded flange 26 and on the other hand by a weld at 34 over two outer sections of the folded flanges 25, said weld extending laterally as shown at 35 up to the edges of the bag with a view to closing the upper end of said bag except for its central section registering with the cut 27 and adapted to serve for the filling of the bag. A welding is also provided along the lines of weld 36 registering with the side walls of the bag along the medial vertical lines of the lateral walls 22.

The package is folded in the usual manner, a lug 37 being glued over the free edge of the rear wall 21b. The bottom of the box is closed through a folding of the flap 24 and the flange 26 is then folded in its turn through an angle of 180° after which the flaps 22 and 29 are folded back and glued in position. The filling may then be performed as described with reference to Figs. 1 to 4, the flap 23 being positioned automatically in a horizontal location with its flange 25 directed upwardly. The upper section of the bag is then closed through a welding between the fractional weld lines 34 so as to close the opening or again the welding may be performed above the edge of the cardboard box defined by the flange 25.

The closing of the package is obtained by folding as shown in Fig. 6 the folded flange 25 and the upper section 38 of the bag over the flap 23. The flap 28 is folded and glued if desired, and the bag of plastic material appears only to view through its two lugs projecting laterally and engaging the flaps 29. The closing is then brought to an end by folding back said flaps 29 and securing them through gluing or through application of an adhesive strip 39.

When it is desired to open the package, the flap 29a is torn open along the breaking outline 30 (Fig. 7). One of the lugs of the bag projects then through the opening thus obtained and it is sufficient to cut off this end so as to obtain a spout 40 through which the contents may be poured out.

The package may be closed again with a sufficient fluid tightness by folding the cut off lug 41 so as to produce a fold along the lower edge of the spout.

The cardboard box of Fig. 8 is constituted by an ordinary cardboard box 42 provided with two main flaps 43 and with two lateral flaps 44. The main flaps 43 in the upper section of the box are provided each with a cut 45 so as to further the filling of the bag inside the box and at least one of said main flaps includes an extension forming a lug 46 pivoting round a line of fold. The bag 47 made for instance of polyethylene is a bellow-shaped bag. One of the bellow-surfaces of the bag being located in registry with the extension 46 is welded to said extension while the other surface of the bellows remains free.

When filling the bag, the free surface of the bellows is spaced laterally from the cooperating surface and preferably air is blown into the plastic bag so as to ensure a preliminary fitting of the bag inside the cardboard box. A filling spout is then introduced as illustrated in Fig. 9 and the filling is proceeded with, after which a weld 48 is produced to close the upper edge of the bag (Fig. 10). The upper section 49 of the bag above the level of the folded flaps is vertical, but the bellows drawn out laterally during the filling form a triangular lug 50 which engages a triangular surface 51 provided on one of the flaps 44, said triangular surface being outlined by a line of initiating breaking. The upper lug section 50 is folded over the upper surface which is formed by the flaps 43 after which the flaps 44 are folded back in their turn and are rigidly secured so as to close the box. When opening the box, the flap section 51 is torn off and the triangular surface 50 of the polyethylene bag projections which allows cutting it at a short distance from its tip so as to form a spout through which the contents may be poured out.

In the embodiment illustrated in Fig. 12, the polyethylene 47 is made rigid with two reinforcing cardboard strips 52 provided with tongues 53, which tongues 53 may engage two slots 54 cut in the extensions 46 of the flaps 43 so as to secure the bag inside the box.

The box according to Fig. 13 is a parallelopipedic cardboard box with two main lateral walls 55 and two small lateral surfaces 56 provided with flaps 57 and 58 at their upper ends while a flap 59 is provided along the lower edge of each of said walls 55. The yielding bag 60 is constituted for instance by a film of plastic material or by two sheets welded together along the edges 61. Said bag is secured to the cardboard box for instance at 62 along the section of the welds 61 corresponding to the length of the lateral walls 56, possibly also over the flaps 59 and on the extension 63 of one of the flaps 57.

One of the walls 55 includes an extension 64 forming a V-shaped flap cooperating with the flaps 59 to close the bottom of the box and which is made rigid through gluing for instance with the corresponding surfaces of the yielding bag. Said flap 64 carries a free tearing off lug 65.

When the box is being shaped as illustrated in Fig. 14, the lug 65 is taken hold of so as to unfold the flap 64 and therethrough the bag 60 whereby the bottom of the bag is given a rectangular cross-section with the formation of triangular flat pleats 66 along the section of the bag 60 extending between the edges of the flap 64 and the flaps 59. This cuts out the deformations leading to an uncontrollable pleating of the bag bottom, as would otherwise occur with packages of the type considered.

Obviously, the above-described embodiments given by way of a mere exemplification are capable of numerous modifications without this widening unduly the scope of the invention as defined in the accompanying claims.

What I claim is:

1. A package for liquid, pasty and pulverulent materials comprising an outer semi-rigid casing including terminal closing flaps, at least one of said closing flaps corresponding to the upper part of said casing, terminating along the medial line of the casing, an extension of said flap, said extension being separated from said flap by a fold forming a hinge allowing this extension to occupy at least one position perpendicular to the flap, a cut in one lateral part of said extension and adjacent part of the flap so as to reduce the length of the extension and adjacent part of the flap to a part of the medial line of the casing and a bellow shaped yielding bag, the breadth of which is identical with the breadth of the side wall of the casing which is fast with the extension carrying flap, the development of the bellows in their expanded condition being equal to the depth of the casing, the bellow shaped yielding bag being secured to the extension of the flap at least over the breadth of one of its bellows, the other bellow being in front of the cut in the extension and flap so as to be free to open.

2. A package for liquid, pasty and pulverulent material as claimed in claim 1 wherein the lateral flap adjacent the cut in the lateral part of the extension and adjacent part of the flap is provided with a line of initiating breaking adapted to release a triangular lug on the bellow of the bag free to open, adapted to form a spout for the pouring out of the contents of said bag.

3. A package for liquid, pasty and pulverulent materials comprising an outer semi-rigid casing including terminal closing flaps, at least one of said closing flaps corresponding to the upper part of said casing, terminating along the medial line of the casing, an extension of said flap, said extension being separated from said flap by a fold forming a hinge allowing this extension to occupy at least one position perpendicular to the flap, a cut in one lateral part of said extension and adjacent part of the flap so as to reduce the length of the extension and adjacent part of the flap to a part of the medial line of the casing and a bellow shaped yielding bag, the breadth of which is identical with the breadth of the side wall of the casing which is fast with the extension carrying flap, the development of the bellows in their expanded condition being equal to the depth of the casing, the bellow shaped yielding bag being welded on the extension of the flap so as to fasten with said extension surfaces of the bag and one of the bellows in its folded position, the other bellow being in front of the cut in the extension and flap so as to be free to open.

4. A package for liquid, pasty and pulverulent materials comprising an outer semi-rigid casing including terminal closing flaps, at least one of said closing flaps corresponding to the upper part of said casing, terminating along the medial line of the casing, an extension of said flap, said extension being separated from said flap by a fold forming a hinge allowing the extension to occupy at least one position perpendicular to the flap, a cut in one lateral part of said extension and adjacent part of the flap so as to reduce the length of the extension and adjacent part of the flap to a part of the medial line of the casing, a cut formed in the foldable extension of the flap, a bellow shaped yielding bag, the breadth of which is identical with the breadth of the side wall of the casing which is fast with the extension carrying flap, the development of the bellows in their expanded condition being equal to the depth of the casing, the bellow shaped yielding bag being welded at least over a part of the breadth of one of its bellows with a reinforcement provided with lug adapted to engage in the cut of the extension to removably secure the yielding bag with the extension, flap and semi-rigid casing the other bellow being in front of the cut in the extension and flap so as to be free to open.

5. A package for liquid, pasty and pulverulent materials comprising an outer semi-rigid casing including terminal closing flaps, two closing flaps corresponding to the upper part of said casing, terminating along the medial line of the casing, extensions of said flaps, each extension being separated from the corresponding flap by a fold forming a hinge allowing the extension to occupy at least a position perpendicular to the flap, a cut in facing lateral parts of said extensions and in the adjacent part of the flaps so as to reduce the length of the extensions and adjacent parts of the flap to a part of the medial line of the casing, a cut formed in each foldable extension of the flaps, a bellow shaped yielding bag, the breadth of which is identical with the breadth of the side wall of the casing which is fast with the extension carrying flap, the development of the bellows in their expanded condition being equal to the depth of the casing, the bellow shaped yielding bag being provided on each of its both surfaces facing the extensions with a reinforcement welded with the said surfaces and the corresponding bellow, said reinforcements comprising free lug adapted to engage each in the cut of the corresponding extension to removably secure the yielding bag with the extensions, flaps and semi-rigid casing, the other bellow being in front of the cuts in the extensions and flaps so as to be free to open.

References Cited in the file of this patent

UNITED STATES PATENTS

| | | |
|---|---|---|
| 2,177,919 | Vogt | Oct. 31, 1939 |
| 2,223,754 | Waters | Dec. 3, 1940 |
| 2,446,308 | Smith | Aug. 3, 1948 |
| 2,562,389 | Piazze | July 31, 1951 |

FOREIGN PATENTS

| | | |
|---|---|---|
| 1,128,387 | France | Jan. 4, 1957 |